(12) United States Patent
Griffin et al.

(10) Patent No.: US 11,150,746 B2
(45) Date of Patent: Oct. 19, 2021

(54) WEARABLE ELECTRONIC DEVICES HAVING USER INTERFACE MIRRORING BASED ON DEVICE POSITION

(71) Applicant: GOOGLE LLC, Mountain View, CA (US)

(72) Inventors: Jason T. Griffin, Kitchener (CA); Steven Henry Fyke, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/451,528

(22) Filed: Jun. 25, 2019

(65) Prior Publication Data

US 2020/0004347 A1 Jan. 2, 2020

Related U.S. Application Data

(60) Provisional application No. 62/691,507, filed on Jun. 28, 2018.

(51) Int. Cl.
*G06F 3/0346* (2013.01)
*G06F 3/038* (2013.01)
*G09G 5/12* (2006.01)

(52) U.S. Cl.
CPC .......... *G06F 3/0346* (2013.01); *G06F 3/0383* (2013.01); *G09G 5/12* (2013.01); *G06F 2203/0331* (2013.01); *G06F 2203/0384* (2013.01); *G09G 2340/0492* (2013.01); *G09G 2354/00* (2013.01)

(58) Field of Classification Search
CPC .... G06F 3/0346; G06F 3/0383; G06F 3/1423; G06F 2203/0331; G06F 2203/0384; G09G 3/001; G09G 5/12; G09G 2354/00
See application file for complete search history.

(56) References Cited

U.S. PATENT DOCUMENTS

| | | | |
|---|---|---|---|
| 8,570,273 B1* | 10/2013 | Smith | G06F 3/03547 345/156 |
| 9,733,700 B2* | 8/2017 | Song | G06F 3/0346 |
| 10,139,906 B1* | 11/2018 | Bai | G06F 3/017 |
| 10,521,009 B2* | 12/2019 | Iyer | G06F 3/017 |
| 2002/0024675 A1* | 2/2002 | Foxlin | G06F 3/0346 356/620 |
| 2011/0007035 A1* | 1/2011 | Shai | G06F 3/0338 345/179 |

(Continued)

*Primary Examiner* — Mihir K Rayan (57) ABSTRACT

Wearable electronic systems having user interface mirroring based on device position are described herein. The wearable electronic systems include a first wearable electronic device having a display and a second wearable electronic device having a device orientation sensor. The device orientation sensor detects a device orientation of the second wearable electronic device and generates a device orientation signal in response to detecting the device orientation. The first wearable electronic device generates and displays an orientable user interface on its display in response to the first wearable electronic device receiving a first device orientation signal from the second wearable electronic device and dynamically reorients the orientable user interface in response to receiving a second device orientation signal from the first wearable electronic device. Methods of controlling an orientation of an orientable user interface presented on the display of a first wearable electronic device are also described herein.

35 Claims, 7 Drawing Sheets

(56) References Cited

U.S. PATENT DOCUMENTS

| | | | |
|---|---|---|---|
| 2012/0017147 A1* | 1/2012 | Mark | H04N 9/3173 |
| | | | 715/702 |
| 2012/0021806 A1* | 1/2012 | Maltz | G02B 27/017 |
| | | | 455/566 |
| 2012/0176396 A1* | 7/2012 | Harper | G09G 5/373 |
| | | | 345/589 |
| 2013/0002578 A1* | 1/2013 | Ito | G06F 3/0488 |
| | | | 345/173 |
| 2013/0212535 A1* | 8/2013 | Kim | G06F 3/04886 |
| | | | 715/841 |
| 2014/0055352 A1* | 2/2014 | Davis | A61B 5/0261 |
| | | | 345/156 |
| 2014/0132512 A1* | 5/2014 | Gomez Sainz-Garcia | |
| | | | G06F 3/017 |
| | | | 345/158 |
| 2015/0062086 A1* | 3/2015 | Nattukallingal | G06F 3/016 |
| | | | 345/175 |
| 2015/0084850 A1* | 3/2015 | Kim | G02B 27/644 |
| | | | 345/156 |
| 2015/0130685 A1* | 5/2015 | Kim | G06F 3/147 |
| | | | 345/3.1 |
| 2015/0277559 A1* | 10/2015 | Vescovi | G06F 3/167 |
| | | | 345/173 |
| 2015/0347080 A1* | 12/2015 | Shin | G06F 3/017 |
| | | | 345/173 |
| 2016/0034157 A1* | 2/2016 | Vranjes | G06F 3/04883 |
| | | | 715/798 |
| 2016/0231819 A1* | 8/2016 | Chavez | G06F 3/0487 |
| 2016/0292563 A1* | 10/2016 | Park | G06F 3/04883 |
| 2017/0038845 A1* | 2/2017 | Chi | G06F 3/04845 |
| 2018/0246565 A1* | 8/2018 | Moon | G06F 3/017 |
| 2018/0292908 A1* | 10/2018 | Kamoda | G06F 3/04842 |

\* cited by examiner

WEARABLE ELECTRONIC DEVICES HAVING USER INTERFACE MIRRORING BASED ON DEVICE POSITION

TECHNICAL FIELD

The present systems, devices, and methods generally relate to wearable electronic devices and particularly relate to wearable electronic devices having user interface mirroring.

BACKGROUND

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, visible to others, and generally present for long periods of time, form factor (i.e., size, geometry, and appearance) is a major design consideration in wearable electronic devices.

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

BRIEF SUMMARY

The various embodiments described herein generally relate to wearable electronic devices having user interface mirroring.

A wearable electronic system may be summarized as including a first wearable electronic device having a first processor, a first non-transitory processor-readable storage medium communicatively coupled to the first processor, a display communicatively coupled to the first processor, and a first communication interface communicatively coupled to the first processor; and a second wearable electronic device having a device orientation sensor and a second communication interface communicatively coupled to the device orientation sensor, the device orientation sensor to detect a device orientation of the second wearable electronic device and generate a device orientation signal in response to detecting the device orientation of the second wearable electronic device, and the second communication interface to transmit the device orientation signal. The first communication interface is communicatively coupleable with the second communication interface to provide communications between the first wearable electronic device and the second wearable electronic device. The first non-transitory processor-readable storage medium of the first wearable electronic device stores processor-executable instructions that, when executed by the first processor, cause the first wearable electronic device to generate and display an orientable user interface on the display of the first wearable electronic device, the orientable user interface orientable in a first orientation in response to the first wearable electronic device receiving a first device orientation signal from the second wearable electronic device and the orientable user interface dynamically reorientable in a second orientation in response to the first wearable electronic device receiving a second device orientation signal from the second wearable electronic device. The device orientation sensor may generate a device orientation signal in response to an orientation change of the second wearable electronic device.

The second wearable electronic device may further comprise a second processor and a second non-transitory processor-readable storage medium communicatively coupled to the second processor, the second non-transitory processor-readable storage medium storing processor executable instructions that, when executed by the second processor, cause the second wearable electronic device to transmit the orientation signal via the second communication interface.

The first non-transitory processor-readable storage medium of the first wearable electronic device may store processor-executable instructions that, when executed by the first processor, cause the first wearable electronic device to: set a first user interface orientation mode when the second wearable electronic device has a first device orientation; set a second user interface orientation mode when the second wearable electronic device has a second device orientation; and dynamically reorient the orientable user interface between the first user interface orientation mode and the second user interface orientation mode in response to the first wearable electronic device receiving the device orientation signal.

The orientable user interface may be enabled to be dynamically reoriented within a selected portion of the display in response to the first wearable electronic device receiving the device orientation signal indicating the orientation change of the second wearable electronic device.

The orientable user interface may be enabled to be dynamically reoriented within another portion of the display in response to the first wearable electronic device receiving the device orientation signal indicating the orientation change of the second wearable electronic device.

The second wearable electronic device may further comprise an input device coupled to the second communication interface.

The orientation change of the second wearable electronic device may be detected by the device orientation sensor.

The orientation change of the second wearable electronic device may be provided manually by a user.

The first wearable electronic device may comprise a head mounted electronic display unit.

The head mounted electronic display unit may comprise a pair of glasses.

The second wearable electronic device may comprise an electronic ring.

The electronic ring may have a first device orientation when worn on a user's left hand and a second device orientation when worn on the user's right hand.

The device orientation sensor may be selected from a group consisting of: an inertial sensor, an accelerometer, and a gyroscope.

The first communication interface of the first wearable electronic device may be a first wireless communication interface; the second communication interface of the second wearable electronic device may be a second wireless communication interface; the first wireless communication interface may be wirelessly communicatively coupleable with the second wireless communication interface to provide wireless communications between the first wearable electronic device and the second wearable electronic device; and the first non-transitory processor-readable storage medium of the first wearable electronic device may store the processor-executable instructions that, when executed by the first processor, cause the first wearable electronic device to generate and display the orientable user interface on a selected portion of the display of the first wearable electronic device, the orientable user interface enabled to be dynamically reoriented in response to the first wearable electronic device receiving the device orientation signal indicating an orientation change of the second wearable electronic device.

The first communication interface of the first wearable electronic device may be a first wireless communication interface; the second communication interface of the second wearable electronic device may be a second wireless communication interface; the first wireless communication interface may be wirelessly communicatively coupleable with the second wireless communication interface to provide wireless communications between the first wearable electronic device and the second wearable electronic device; the first non-transitory processor-readable storage medium of the second wearable electronic device may store processor-executable instructions that, when executed by the second processor, cause the second wearable electronic device to wirelessly transmit, via the second wireless communication interface, the device orientation signal; the first non-transitory processor-readable storage medium of the first wearable electronic device may store processor-executable instructions that, when executed by the first processor, cause the first wearable electronic device to generate and display the orientable user interface on a selected portion of the display of the first wearable electronic device, the orientable user interface enables to be dynamically reoriented in response to the second wearable electronic device receiving the device orientation signal indicating an orientation change of the first wearable electronic device; and the processor-executable instructions stored in the first non-transitory processor-readable storage medium when executed by the first processor, and the processor-executable instructions stored in the second non-transitory processor-readable storage medium when executed by the second processor, may cause the first wearable electronic device to dynamically reorient the orientable user interface between a first user interface orientation mode and a second user interface orientation mode in response to the first wearable electronic device receiving the device orientation signal.

A method of controlling an orientation of an orientable user interface presented on a display of a first wearable electronic device may be summarized as generating a first device orientation signal by a device orientation sensor of a second wearable electronic device, the first device orientation signal indicative of a first orientation of the second wearable electronic device; transmitting, by the second wearable electronic device, the first device orientation signal; receiving, by the first wearable electronic device, the first device orientation signal; and dynamically orienting the orientable user interface presented on the display of the first wearable electronic device in response to the first wearable electronic device receiving the first device orientation signal.

The method may include generating a second device orientation signal by the device orientation sensor of the second wearable electronic device, the second device orientation signal indicative of a second orientation of the second wearable electronic device; transmitting, by the second wearable electronic device, the second device orientation signal; receiving, by the first wearable electronic device, the second device orientation signal; and dynamically reorienting the orientable user interface presented on the display of the first wearable electronic device in response to the first wearable electronic device receiving the second device orientation signal.

The dynamically reorienting the orientable user interface may comprise dynamically reorienting the orientable user interface between a first user interface orientation mode and a second user interface orientation mode, the first user interface orientation mode set when the second wearable electronic device has a first device orientation and the second user interface orientation mode set when the second wearable electronic device has a second device orientation.

The dynamically reorienting the orientable user interface may be within a selected portion of the display of the first wearable electronic device.

The dynamically reorienting the orientable user interface may be within another portion of the display of the first wearable electronic device.

The first wearable electronic device may comprises a head mounted electronic display unit, wherein the receiving, by the first wearable electronic device, the first device orientation signal may include receiving, by the head mounted electronic display, the first device orientation signal; and dynamically orienting the orientable user interface presented on the display of the first wearable electronic device in response to the first wearable electronic device receiving the first device orientation signal may include dynamically orienting the orientable user interface presented on the display of the head mounted electronic display in response to the head mounted electronic display receiving the first device orientation signal.

The head mounted electronic display unit may comprises a pair of glasses, wherein: the receiving, by the first wearable electronic device, the first device orientation signal may include receiving, by the pair of glasses, the first device orientation signal; and the dynamically orienting the orientable user interface presented on the display of the first wearable electronic device in response to the first wearable electronic device receiving the first device orientation signal may include dynamically orienting the orientable user interface presented on the display of the pair of glasses in response to the pair of glasses receiving the first device orientation signal.

The second wearable electronic device may comprises an electronic ring, wherein the generating the second device orientation signal by the device orientation sensor of the second wearable electronic device, the second device orientation signal indicative of a second orientation of the second wearable electronic device may include generating the second device orientation signal by the device orientation sensor of the electronic ring, the second device orientation signal indicative of a second orientation of the electronic ring; and the transmitting, by the second wearable electronic device, the first device orientation signal may include transmitting, by the electronic ring, the first device orientation signal.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The headings and Abstract of the Disclosure provided herein are for convenience only and do not interpret the scope or meaning of the embodiments.

Herein, the term "carried by" should be understood to refer to physical coupling of two objects, the physical coupling including coupling on, within, along, flush with, in a recess, etc.

A user may have more than one wearable electronic device and it can be desirable to have wearable electronic devices of different sizes for comfort. When such wearable electronic devices are used and communicate with another electronic device, it can be desirable to have the communication hardware of the wearable electronic device be transferable between wearable electronic devices.

Figure 1:
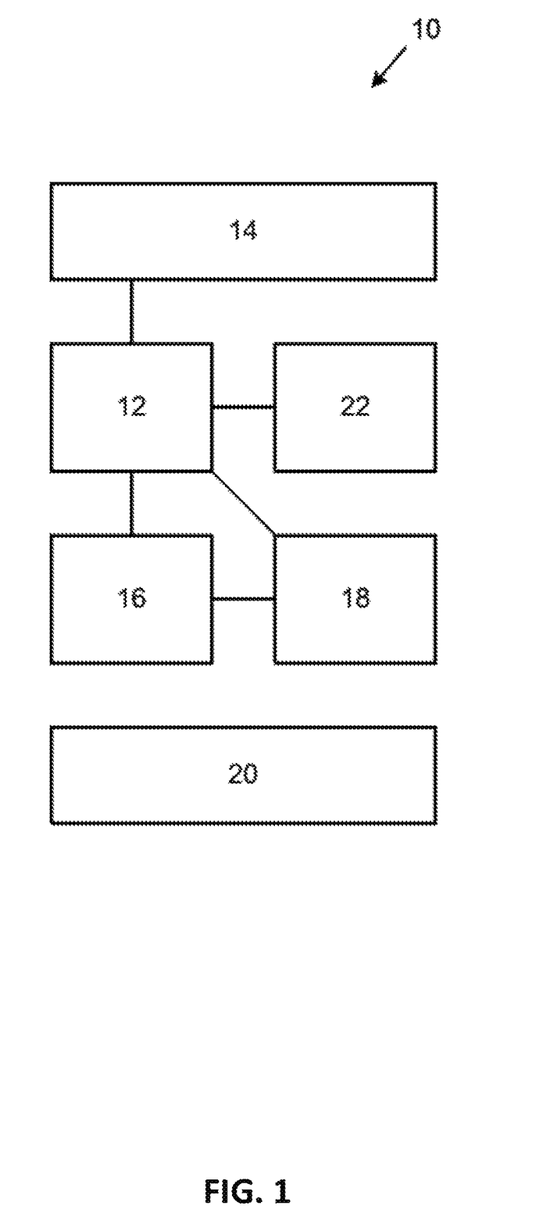
FIG. 1 is a block diagram illustrating a wearable electronic device, according to one embodiment.

Referring now to FIG. 1, shown therein is a block diagram illustrating a wearable electronic device 10 in accordance with one or more implementations. Device 10 includes one or more communication interfaces 16 (e.g., one or more tethered connector ports, radios and associated antennas (not shown)), an input/output (I/O) subsystem 18, and one or more sensors 22. Device 10 may also include one or more non-transitory computer- or processor-readable storage media 12, one or more processors 14, and an optional power system 20.

The one or more non-transitory computer- or processor-readable storage media 12 optionally includes high-speed random access memory and optionally also includes non-volatile memory, such as one or more magnetic disk storage devices, flash memory devices, or other non-volatile solid-state memory devices. Access to storage medium 12 by other components of wearable electronic device 10, such as processors 14 is, optionally, controlled by a memory controller (not shown), for example via a bus or other communications channel. The one or more non-transitory computer- or processor-readable media 12 stores processor-executable instructions, and/or data, executable by the one or more processors 14, and which when executed cause the one or more processors 14 to perform the various methods described herein.

The one or more processors 14 may run or execute various software programs and/or sets of instructions stored in the one or more non-transitory computer- or processor-readable medial 2 to perform various functions for wearable electronic device 10 and to process data.

The one or more communication interfaces 16 receive and send signals (e.g., radio frequency RF or microwave frequency signals, also called electromagnetic signals). The one or more communication interfaces 16 convert electrical signals to/from electromagnetic signals and communicate with communications networks and other communications devices via the electromagnetic signals. The one or more communication interfaces 16 optionally include circuitry for performing such operations, including but not limited to a tethered connector port (e.g., USB, firewire, lightning connector, etc.), an antenna system, an RF transceiver, one or more amplifiers, a tuner, one or more oscillators, a digital signal processor, a CODEC chipset, a subscriber identity module (SIM) card, memory, and so forth. The one or more communication interfaces 16 optionally communicate with networks, such as the Internet, an intranet and/or a wireless network, such as a cellular telephone network, a wireless local area network (LAN) and/or a metropolitan area network (MAN), and other devices by wireless communication.

I/O subsystem 18 couples input/output peripherals of wearable electronic device 10, such input or control devices, with a peripherals interface (not shown). I/O subsystem 18 can include a controller for each of the input or devices.

Power system 20 generally provides electrical power to the various components of the wearable electronic device 10 (not all connections shown). Power system 20 optionally includes a power management system, one or more power sources (e.g., primary battery cells, secondary power cells, fuel cells, super- or ultra-capacitors), a recharging system, a power failure detection circuit, a power converter or inverter, a power status indicator (e.g., a light-emitting diode (LED)) and any other components associated with the generation, management and distribution of power in portable devices. The recharging system may receive wired power (from e.g. a micro-USB charger) or wireless power via receipt of electromagnetic waves by one or more inductors or inductive interfaces, and provide the electrical power to the one or more power sources via one or more wired or electrically conductive paths.

Wearable electronic device 10 also includes one or more sensors 22. Sensors 22 can include accelerometers, gyroscopes, magnetometers (e.g., as part of an inertial measurement unit (IMU)), vibration, shock, impact, and any other appropriate inertial sensors (herein referred to as impact sensors) to obtain information representative of a position, orientation, change in position and, or change in orientation (e.g., attitude), acceleration, angular velocity, and/or vibration of the wearable electronic device 10. In some implementations, these sensors can be coupled with a peripherals interface (not shown).

It should be appreciated that wearable electronic device 10 is only one example of a wearable electronic device, and that wearable electronic device 10 optionally has more or fewer components than shown, optionally combines two or more components, or optionally has a different configuration or arrangement of the components. The various components shown in FIG. 1 are implemented in hardware, software, firmware, or a combination thereof, including one or more signal processing and/or application specific integrated circuits.

Figure 2:
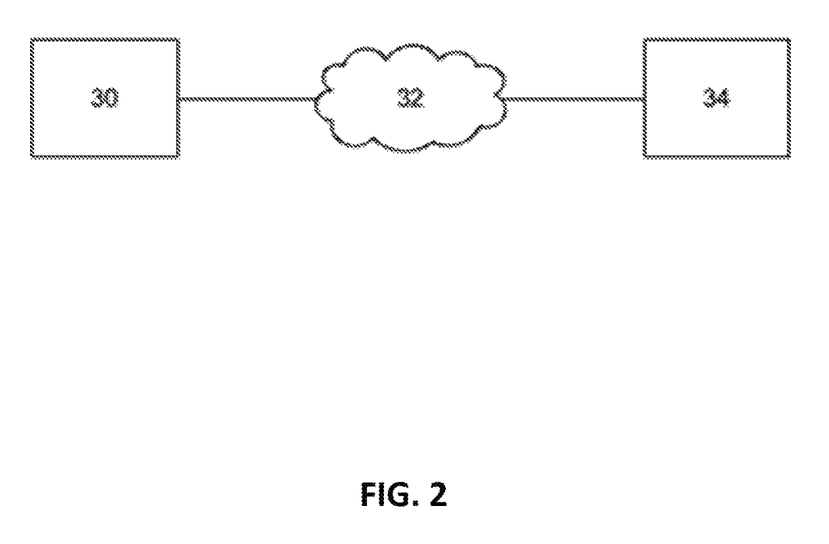
FIG. 2 is a block diagram illustrating a wearable electronic device communicating with an external electronic device, according to one embodiment.

FIG. 2 is a block diagram illustrating a first wearable electronic device 30 communicating with a second wearable electronic device 34, in accordance with one or more implementations described herein. Second wearable electronic device 34 may include a display screen displaying a user interface for viewing by the user of the first wearable electronic device 30.

First wearable electronic device 30 communicates with second wearable electronic device 34 via a communications channel, for instance a communication network 32, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the second wearable electronic device 34 and the first wearable electronic device 30.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

Referring now to FIGS. 3A to 3F (collectively referred to as FIG. 3 herein), shown therein are right side, front, left side, right perspective, top, and left perspective views, respectively, of a system 100 for controlling a user interface orientation on a wearable electronic device. The system 100 includes first and second wearable electronic devices. According to at least one implementation, the first wearable electronic device can be a head mounted electronic display unit 110 and the second wearable electronic device can be an electronic ring 120, as shown in FIG. 3. Optionally, the system 100 can also include a connecting case 130 for the wearable electronic devices. An example of a similar system is described in US Patent Application Publication 2017-0097753. As illustrated in FIGS. 3A to 3F, the head mounted electronic display unit 110 and the electronic ring 120 are each shown positioned outside of an interior of the connecting case 130.

Figure 3A:
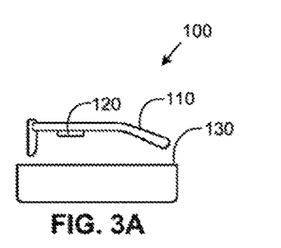
FIGS. 3A to 3F are right side, front, left side, right side perspective, top and left side perspective views of a wearable electronic device having a rotatable input device, according to another embodiment.
Figure 3B:
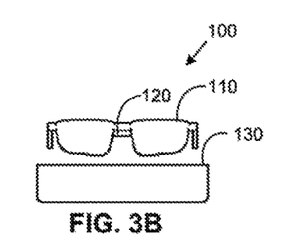
Figure 3C:
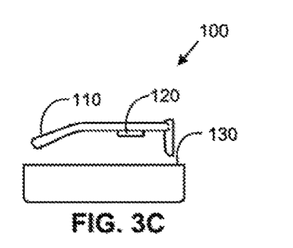
Figure 3D:
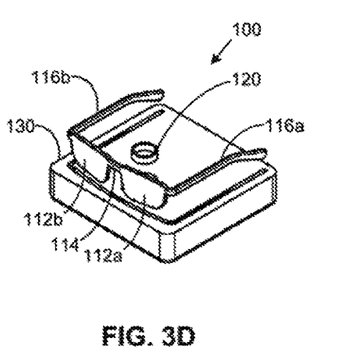

The head mounted electronic display unit 110 can be a pair of glasses, as shown in FIG. 3D. The pair of glasses include a frame holding a pair of lenses 112a and 112b (collectively referred to as 112 herein). The frame includes a bridge 114 between the lenses, as well as a right arm 116a and a left arm 116b (collectively referred to as 116 herein). The shape of the glasses is shown for illustrative purposes and is not limited to the illustrated shape. Other shapes can be used. Furthermore, other head mounted electronic display units 110 can be used. For example, a head mounted electronic display unit 110 may cover a portion of the user's head, such as a helmet, may rest on top of a user's head, and/or wrap around a user's head, such as a headband. A head mounted electronic display unit 110 may further include fastening or elastic members to secure to the user's head.

The electronic ring 120 can be worn around a finger of a user, for example a ring finger or an index finger on a hand of the user. The shape of the electronic ring 120 is shown for illustrative purposes and is not limited to the illustrated shape. Other shapes can be used. The electronic ring 120 can have any appropriate shape that allows the ring body to remain positioned around the finger of the user. For example, the electronic ring 120 can have a general shape of a circular band (open or closed), a helix, or a spiral. With a helix or spiral shape, the electronic ring 120 can have one or more turns. The electronic ring 120 can also have a break. With a break in the electronic ring 120, the electronic ring may expand to accommodate or tolerate fingers having different ring sizes. Some example systems and devices that may be included in the electronic ring 120 are described in U.S. Provisional Patent Application Ser. No. 62/607,819 and U.S. Provisional Patent Application Ser. No. 62/608,463.

Figure 3E:
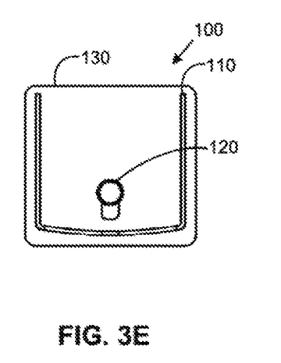
Figure 3F:
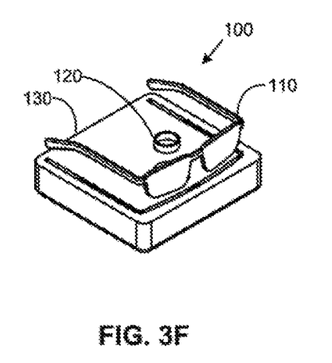

As shown in FIG. 3E, the connecting case 130 can have an interior or recesses and be shaped to receive the first wearable electronic device 110 and/or the second wearable electronic device 120. The shape of the connecting case 130 is shown for illustrative purposes and is not limited to the illustrated shape. As shown in FIG. 3, the connecting case 130 can receive both the first wearable electronic device 110 and the second wearable electronic device 120. That is, the connecting case 130 can receive the head mounted electronic display unit 110 and the electronic ring 120. In some implementations, the connecting case 130 can receive only one wearable electronic device. When the connecting case 130 receives only one wearable electronic device, the connecting case 130 can include a connection port to communicatively couple to a second wearable electronic device or a second connecting case that holds the second wearable electronic device.

Figure 4A:
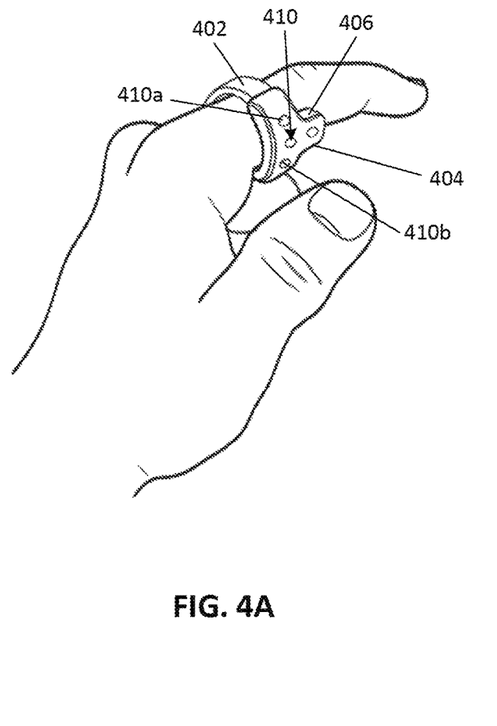
FIGS. 4A and 4B are perspective views of the wearable electronic device of FIG. 3 in a first orientation and in a second orientation, respectively.
Figure 4B:
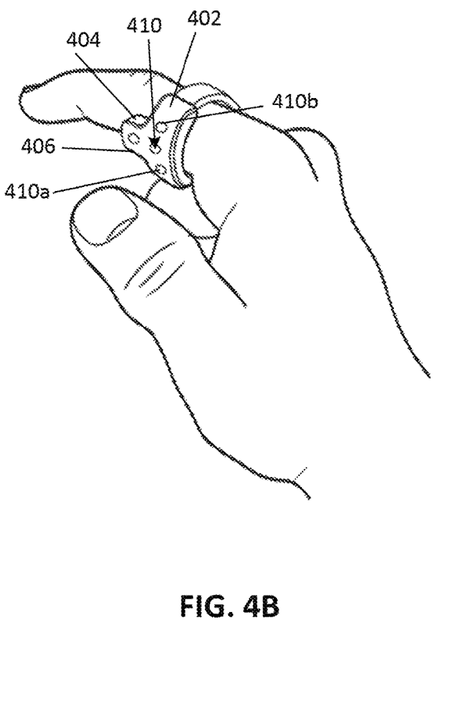

FIGS. 4A and 4B illustrates other embodiments of an electronic ring 402 as a second wearable electronic device being worn on a finger of a user. FIG. 4A shows the wearable electronic ring 402 being worn on an index finger of left hand of the user and FIG. 4B shows the wearable electronic ring 402 being worn on an index finger of a right hand of the user.

In some implementations, wearable electronic ring 402 may detect an orientation change of the wearable electronic ring 402 by detecting a position of the electronic ring 402. For instance, wearable electronic ring 402 may include a device orientation sensor (not shown in FIGS. 4A and 4B; e.g. sensor 22) detecting a position of the wearable electronic ring 402. The device orientation sensor may include an accelerometer, gyroscope, magnetometer (e.g. as part of an inertial measurement unit (IMU)), vibration, shock, impact, and any other appropriate inertial sensors (herein referred to as impact sensors) for obtaining information concerning the position (e.g., attitude), acceleration, orientation, angular velocity, and/or vibration of the wearable electronic ring 402.

In some implementations, the device orientation sensor may be an accelerometer that is enabled to detect a position and/or orientation of wearable electronic ring 402 relative to the ground. For instance, the device orientation sensor may detect the position and/or orientation of the wearable electronic ring 402 relative to the ground based on an asymmetry in the shape of the wearable electronic ring 402. In this embodiment, wearable electronic ring 402 may include a first side 404 and a second side 406. When wearable electronic ring 402 is worn on a finger of a user's right hand, second side 406 of the wearable electronic ring 402 may tend to be closer to the ground than first side 404 when the wearable electronic ring 402 is used (e.g. when a user is activating input devices 410). Correspondingly, when the wearable electronic ring 402 is worn on a finger of a user's left hand, the first side 404 may be closer to the ground than second side 406 when the wearable electronic ring 402 is used. The device orientation sensor may be able to detect which side of the first side 404 and the second side 406 of the wearable electronic ring 402 is closest to the ground and may therefore determine which hand of the user the wearable electronic ring 402 is worn.

In other implementations, the device orientation sensor may use pattern detection to detect a position and/or orientation of wearable electronic ring 402. For example, a user's left hand and right hand may have differing swing patterns while the user is walking and the device orientation sensor may be able to assess each swing pattern and determine when the wearable electronic ring 402 is being worn on the user's left hand and on the user's right hand.

The skilled person will understand that there are other mechanisms of which the device orientation sensor may detect a position and/or orientation of wearable electronic ring 402 and therefore an orientation change of the wearable electronic ring 402 when the wearable electronic ring 402 is moved between being worn on a finger of the user's left hand and on a finger of the user's right hand.

In some implementations, a processor of a first wearable electronic device (e.g. first wearable electronic device 110) may poll the device orientation sensor over a period of time to assess an orientation of the wearable electronic ring 402 and to determine if a change in orientation has occurred.

In other implementations, a processor of wearable electronic ring 402 may poll the device orientation sensor over a period of time to assess an orientation of the wearable electronic ring 402 and to determine if a change in orientation has occurred.

In other implementations, other mechanisms may be used to indicate a change in orientation of the wearable electronic ring 402. For example, a change of orientation of the wearable electronic ring 402 may be manually entered into the wearable electronic ring 402 by the user (e.g. using input device 410 of the wearable electronic ring 402).

The device orientation sensor, in response to a change in orientation of the wearable electronic ring 402, generates a device orientation signal. In some implementations, the device orientation signal may also be generated by a processor of the wearable electronic device 402. For instance, the device orientation signal may be generated in response to the device orientation sensor detecting that the wearable electronic ring 402 has undergone a change of orientation.

In some implementations, the device orientation sensor can generate the device orientation signal and transmit the device orientation signal directly from the wearable electronic ring 402 to the first wearable electronic device (e.g. in the absence of processing at the wearable electronic ring 402). Further, in some implementations where the wearable electronic ring 402 includes a first input device 410, the device orientation sensor can append IMU data to the device orientation signal and transmit the device orientation signal directly from the wearable electronic ring 402 (e.g. in the absence of processing at the wearable electronic ring 402) to the first wearable electronic device.

A communication interface (e.g. communication interface 16) of wearable electronic ring 402 transmits the device orientation signal to a first wearable electronic device (not shown in FIGS. 4A and 4B; e.g. first wearable electronic device 110). In some implementations, the device orientation signal is transmitted by the wearable electronic ring 402 in response to the device orientation sensor detecting that the wearable electronic device 402 has undergone a change in orientation. In some implementations, the device orientation signal is transmitted by the wearable electronic ring 402 in response to the first wearable electronic device polling the wearable electronic ring 402.

The first wearable electronic device is configured to generate and present an orientable user interface on a selected portion of a display of the first wearable electronic device (e.g. glasses 110). In some embodiments, the orientable user interface may be enabled to be dynamically reoriented in response to the first wearable electronic device receiving the device orientation signal from the wearable electronic device 402 indicating an orientation change of the wearable electronic device 402. For example, in some embodiments, a mirror image (e.g. a reflected duplication) of the orientable user interface may be presented on a selected portion of the display of the first wearable electronic device in response to an orientation change of the wearable electronic device 402. The selected portion of the display of the first wearable electronic device may be the same portion of the display of the first wearable electronic device as the user interface was presented prior to the orientation change of the wearable electronic device 402. The selected portion of the display of the first wearable electronic device may also be another portion of the display of the first wearable electronic device as the user interface was presented prior to the orientation change of the wearable electronic device 402. For instance, in the example of the wearable electronic device 402 being an electronic ring and the first wearable electronic device being a pair of electronic glasses, the orientable user interface may be presented on a left lens of the electronic glasses when the electronic ring is worn on a finger of the user's left hand (as shown in FIG. 4A) and a mirror image of the user interface may be shown on the right lens of the electronic glasses when the electronic ring is worn on a finger of the user's right hand (as shown in FIG. 4B).

In some embodiments, the wearable electronic device 402 further comprises at least one first input device 410. First input device 410 may be communicatively coupled to the first processor or to the device orientation sensor.

Figure 5:
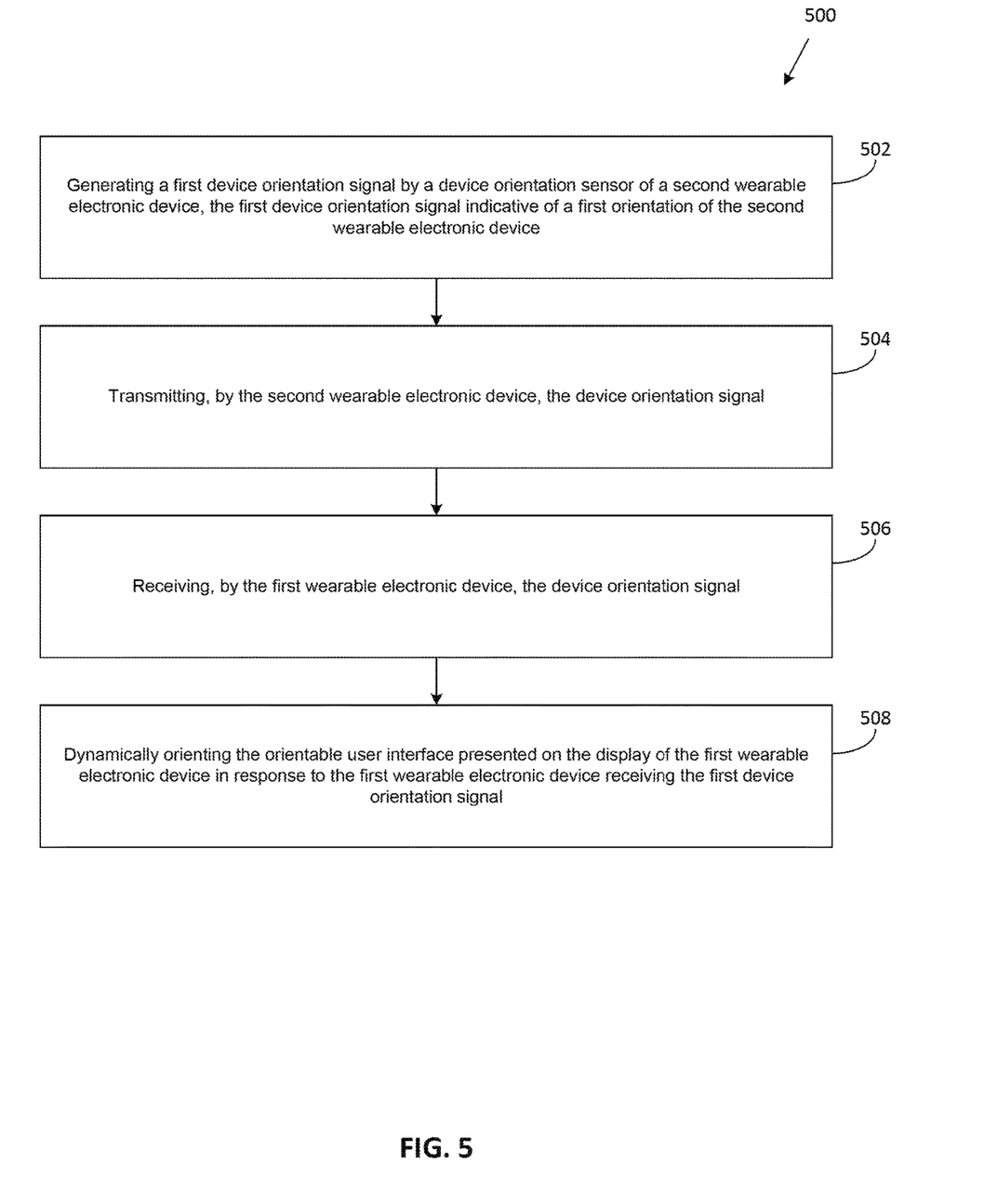
FIG. 5 is a flow-diagram of a method of controlling an orientation of an orientable user interface presented on a display of a first wearable electronic device, according to one embodiment.

Referring now to FIG. 5, shown therein is a flow-diagram of method 500 of controlling an orientation of a user interface presented on a display of a wearable electronic device in accordance with the present systems, devices, and methods. The wearable electronic devices may be substantially similar to the wearable electronic devices 10, 30, and 34 of FIGS. 1 and 2, and the head mounted electronic display unit 110 and the electronic ring 120 of FIGS. 3 and 4. Furthermore, while method 500 is described with the electronic ring 120 as a second wearable electronic device and the head mounted electronic display unit 110 as a first wearable electronic device, those of skill in the art will understand that the first wearable electronic device and the second wearable electronic device can be any wearable electronic devices, provided that the first wearable electronic device has a display.

Method 500 includes four acts 502, 504, 506 and 508 though those of skill in the art will appreciate that in alternative embodiments, certain acts may be omitted and/or additional acts may be added. Those of skill in the art will also appreciate that the illustrated order of the acts is shown for exemplary purposes only and may change in alternative embodiments.

At 502, a device orientation sensor of the second wearable electronic device generates a first device orientation signal, the first device orientation signal indicative of a first orientation of the second wearable electronic device. The first device orientation signal may be generated in response to a change of orientation of the second wearable electronic device. In some implementations, the change of orientation may be detected by the device orientation sensor of the second wearable electronic device. In other implementations, the change of orientation may be manually input by the user of the second wearable electronic device.

At 504, the second wearable electronic device transmits the device orientation signal. The device orientation signal may be transmitted from a communications interface of the second wearable electronic device. The device orientation signal may be a wireless signal.

At 506, the first wearable electronic device receives the device orientation signal. The device orientation signal may indicate the orientation (e.g., an initial orientation) of the second wearable electronic device to the first wearable electronic device, and/or the device orientation signal may indicate to the first wearable electronic device that the second wearable electronic device has undergone a change of orientation.

At 508, an orientable user interface generated and/or presented on a display of the first wearable electronic device is dynamically oriented (e.g., by the first wearable electronic device) in response to the first wearable electronic device receiving the orientation signal. Such dynamic orientation may include rotating, reflecting (e.g., along a vertical, horizontal, or diagonal axis), or otherwise adapting the orientable user interface to accommodate or account for the first orientation of the second wearable electronic device.

In some implementations the dynamically orienting the orientable user interface includes dynamically reorienting the orientable user interface between a first user interface orientation mode and a second user interface orientation mode. The first user interface orientation mode may be generally set when the second wearable electronic device has a first device orientation (e.g. the second wearable electronic device is worn on a left hand of a user) and the second user interface orientation mode may generally be set when the second wearable electronic device has a second device orientation (e.g. the second wearable electronic device is worn on a right hand of the user).

In some implementations, the dynamically reorienting the orientable user interface is within a portion of the display of the first wearable electronic device. In other implementations, the dynamically reorienting the orientable user interface is within another portion of the display of the first wearable electronic device. For instance, when the first wearable electronic device is a pair of electronic glasses, the dynamically reorienting the orientable user interface may include displaying the orientable user interface on a different lens of the glasses after the orientable user interface has been dynamically reoriented.

In one specific implementation, the orientable user interface may be presented on at least a portion of a left lens of the electronic glasses when the electronic ring is worn on a finger of the user's left hand (as shown in FIG. 4A) and a mirror image of the orientable user interface may be presented on another portion of the left lens of the electronic glasses when the electronic ring is worn on a finger of the user's right hand (as shown in FIG. 4B). For instance, when the electronic ring is worn on a finger of the user's left hand, the user interface may be presented on a left side of the left lens of the electronic glasses, and when the electronic ring is worn on a finger of the user's right hand, a mirror image of the user interface may be presented on a right side of the left lens of the electronic glasses.

In another implementation, the orientable user interface may be presented on at least a portion of a left lens of the electronic glasses when the electronic ring is worn on a finger of the user's left hand (as shown in FIG. 4A) and a mirror image of the orientable user interface may be presented on at least a portion of the right lens of the electronic glasses when the electronic ring is worn on a finger of the user's right hand (as shown in FIG. 4B). The skilled person will appreciate that various other positions and configurations for the orientable user interface are possible using the devices, systems and methods described herein.

Figure 6A:
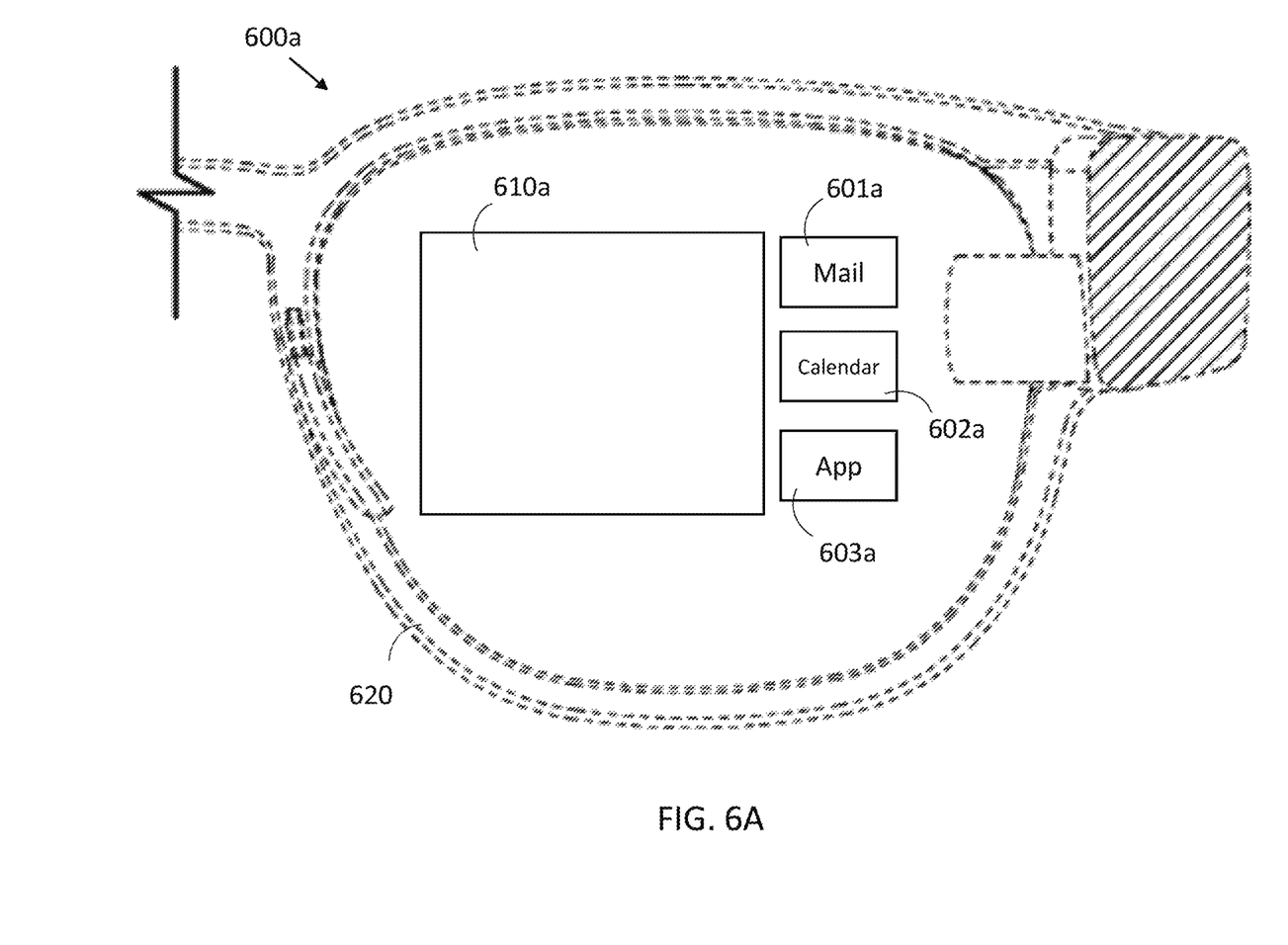
FIG. 6A is an illustrative diagram showing an orientable user interface displayed in a first orientation by a wearable heads-up display in accordance with the present systems, devices, and methods.

FIG. 6A is an illustrative diagram showing an orientable user interface 600a displayed in a first orientation by a wearable heads-up display 620 in accordance with the present systems, devices, and methods. Orientable user interface 600a includes exemplary icons or buttons 601a, 602a, and 603a representative of user-selectable elements or menu items ("icons"), and an application display area 610a representative of an application window. Icon 601a correspond to a mail application, icon 602a corresponds to a calendar application, and icon 603a corresponds to a generic third application. In the first orientation of orientable user interface 600a depicted in FIG. 6A, icons 601a, 602a, and 603a are arranged in a column to the right of application display area 610a. The orientable user interface 600a and/or elements which comprise all or a portion of the orientable user interface 600a are selectively orientable (i.e., positionable and/or rotatable and/or moveable) with respect to a field-of-vision of a user or with respect to a perimeter of a lens or front frame portion (e.g., rim) of the wearable heads-up display 620, either as a whole (i.e., all of the elements comprising the UI) or individually.

Wearable heads-up display 620 may correspond to a first wearable electronic device and the first orientation of orientable user interface 600a may correspond to, for example, a first orientation of a second wearable electronic device (not shown in FIG. 6A) in communication with wearable heads-up display 620, the second wearable electronic device having a device orientation sensor to detect the orientation of the second wearable electronic device.

Figure 6B:
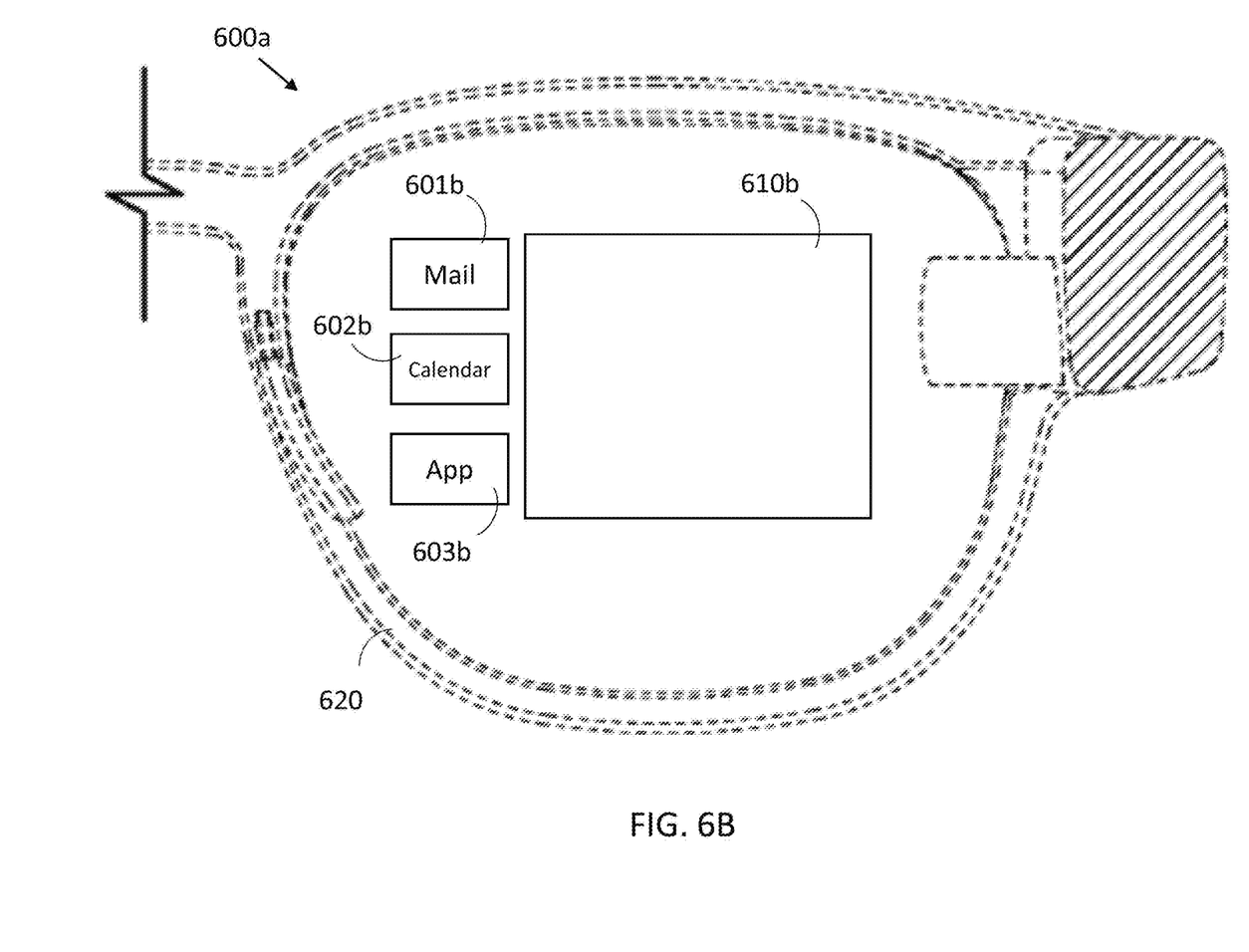
FIG. 6B is an illustrative diagram showing the orientable user interface from FIG. 6A displayed in a second orientation by a wearable heads-up display in accordance with the present systems, devices, and methods.

FIG. 6B is an illustrative diagram showing an orientable user interface 600b displayed in a second orientation by wearable heads-up display 620 in accordance with the present systems, devices, and methods. The content of orientable user interface 600b is substantially similar to that of orientable user interface 600a from FIG. 6A, except that in FIG. 6B orientable user interface 600b has been re-oriented and displayed in a second orientation that is different from the first orientation of orientable user interface 600a depicted in FIG. 6A. Specifically, orientable user interface 600b includes icons 601b, 602b, and 603b arranged in a column to the left of application display area 610b. In other words, the second orientation of orientable user interface 600b in FIG. 6B corresponds to a reflection about a vertical axis of the first orientation of orientable user interface 600a from FIG. 6A. Thus, the second orientation of orientable user interface 600b may correspond to, for example, a second orientation of a second wearable electronic device (not shown in FIG. 6B) in communication with wearable heads-up display 620, the second wearable electronic device having a device orientation sensor to detect the orientation of the second wearable electronic device.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic system comprising:
a first wearable electronic device having a first processor, a first non-transitory processor-readable storage medium communicatively coupled to the first processor, a display communicatively coupled to the first processor, and a first communication interface communicatively coupled to the first processor; and
a second wearable electronic device having a device orientation sensor and a second communication interface communicatively coupled to the device orientation sensor, the device orientation sensor to detect a device orientation of the second wearable electronic device and generate a device orientation signal in response to detecting the device orientation of the second wearable electronic device, and the second communication interface to transmit the device orientation signal; wherein:
the first communication interface is communicatively coupleable with the second communication interface to provide communications between the first wearable electronic device and the second wearable electronic device; and
the first non-transitory processor-readable storage medium of the first wearable electronic device stores processor-executable instructions that, when executed by the first processor, cause the first wearable electronic device to generate and display an orientable user interface on the display of the first wearable electronic device, the orientable user interface orientable in a first orientation determined based on a first orientation of the second wearable electronic device on a user, the first orientation on the user represented by a first device orientation signal received from the second wearable electronic device and the orientable user interface dynamically reorientable in a second orientation determined based on a second orientation of the second wearable electronic device on the user, the second orientation on the user represented by a second device orientation signal received from the second wearable electronic device.

2. The system of claim 1 wherein the device orientation sensor generates a device orientation signal in response to an orientation change of the second wearable electronic device, the device orientation signal indicating the orientation change of the second wearable electronic device.

3. The system of claim 2 wherein the orientable user interface is enabled to be dynamically reoriented within a selected portion of the display in response to the first wearable electronic device receiving the device orientation signal indicating the orientation change of the second wearable electronic device.

4. The system of claim 2 wherein the orientation change of the second wearable electronic device is detected by the device orientation sensor.

5. The system of claim 1 wherein
the second wearable electronic device further comprises a second processor and a second non-transitory processor-readable storage medium communicatively coupled to the second processor, the second non-transitory processor-readable storage medium storing processor executable instructions that, when executed by the second processor, cause the second wearable electronic device to transmit the device orientation signal via the second communication interface.

6. The system of claim 5 wherein
the first communication interface of the first wearable electronic device is a first wireless communication interface;
the second communication interface of the second wearable electronic device is a second wireless communication interface;
the first wireless communication interface is wirelessly communicatively coupleable with the second wireless communication interface to provide wireless communications between the first wearable electronic device and the second wearable electronic device;
the first non-transitory processor-readable storage medium of the second wearable electronic device stores processor-executable instructions that, when executed by the second processor, cause the second wearable electronic device to wirelessly transmit, via the second wireless communication interface, the device orientation signal;
the first non-transitory processor-readable storage medium of the first wearable electronic device stores processor-executable instructions that, when executed by the first processor, cause the first wearable electronic device to generate and display the orientable user interface on a selected portion of the display of the first wearable electronic device, the orientable user interface enabled to be dynamically reoriented in response to the first wearable electronic device receiving a device orientation signal indicating an orientation change of the second wearable electronic device; and
the processor-executable instructions stored in the first non-transitory processor-readable storage medium when executed by the first processor, and the processor-executable instructions stored in the second non-transitory processor-readable storage medium when executed by the second processor, cause the first wearable electronic device to dynamically reorient the orientable user interface between a first user interface orientation mode and a second user interface orientation mode in response to the first wearable electronic device receiving the device orientation signal.

7. The system of claim 1 wherein the first non-transitory processor-readable storage medium of the first wearable electronic device stores processor-executable instructions that, when executed by the first processor, cause the first wearable electronic device to:
set a first user interface orientation mode when the second wearable electronic device has a first device orientation;
set a second user interface orientation mode when the second wearable electronic device has a second device orientation; and
dynamically reorient the orientable user interface between the first user interface orientation mode and the second user interface orientation mode in response to the first wearable electronic device receiving the device orientation signal.

8. The system of claim 1 wherein
the orientable user interface is enabled to be dynamically reoriented within another portion of the display in response to the first wearable electronic device receiving the device orientation signal indicating an orientation change of the second wearable electronic device.

9. The system of claim 1 wherein the first wearable electronic device comprises a head mounted electronic display unit.

10. The system of claim 1 wherein the second wearable electronic device comprises an electronic ring.

11. The system of claim 10 wherein the electronic ring has a first device orientation when worn on a user's left hand and a second device orientation when worn on the user's right hand.

12. The system of claim 1 wherein the device orientation sensor is selected from a group consisting of: an inertial sensor, an accelerometer, and a gyroscope.

13. The system of claim 1 wherein
the first communication interface of the first wearable electronic device is a first wireless communication interface;
the second communication interface of the second wearable electronic device is a second wireless communication interface;
the first wireless communication interface is wirelessly communicatively coupleable with the second wireless communication interface to provide wireless communications between the first wearable electronic device and the second wearable electronic device; and
the first non-transitory processor-readable storage medium of the first wearable electronic device stores the processor-executable instructions that, when executed by the first processor, cause the first wearable electronic device to generate and display the orientable user interface on a selected portion of the display of the first wearable electronic device, the orientable user interface enabled to be dynamically reoriented in response to the first wearable electronic device receiving a device orientation signal indicating an orientation change of the second wearable electronic device.

14. A method comprising:
generating a first device orientation signal by a device orientation sensor of a first wearable electronic device, the first device orientation signal indicative of a first orientation of the first wearable electronic device as oriented on a user; and transmitting, by the first wearable electronic device, the first device orientation signal to a second wearable electronic device, wherein the first device orientation signal is receivable by the second wearable electronic device to
dynamically orient an orientable user interface presented on a display of the second wearable electronic device to an orientation that is based on the first orientation of the first wearable electronic device as oriented on the user indicated by the first device orientation signal.

15. The method of claim 14, further comprising:
generating a second device orientation signal by the device orientation sensor of the first wearable electronic device, the second device orientation signal indicative of a second orientation of the first wearable electronic device; and
transmitting, by the first wearable electronic device, the second device orientation signal, wherein the second device orientation signal is receivable by the second wearable electronic device to
dynamically reorient the orientable user interface presented on the display of the second wearable electronic device to different orientation that is based on the second orientation of the first wearable electronic device indicated by the second device orientation signal.

16. The method of claim 15 wherein the dynamically reorienting the orientable user interface comprises
dynamically reorienting the orientable user interface between a first user interface orientation mode and a second user interface orientation mode, the first user interface orientation mode set when the first wearable electronic device has a first device orientation and the second user interface orientation mode set when the first wearable electronic device has a second device orientation.

17. The method of claim 15 wherein the dynamically reorienting the orientable user interface is within a selected portion of the display of the second wearable electronic device.

18. The method of claim 14 wherein the second wearable electronic device comprises a head mounted electronic display unit, and wherein the first device orientation signal is receivable by the second wearable electronic device to:
dynamically orient the orientable user interface on the head mounted electronic display unit to the orientation that is based on the first orientation of the first wearable electronic device indicated by the first device orientation signal.

19. The method of claim 18 wherein the head mounted electronic display unit comprises a pair of glasses, the pair of glasses comprising the display, and wherein the first device orientation signal is receivable by the second wearable electronic device to:
dynamically orient the orientable user interface on the display based on the first orientation of first wearable electronic device indicated by the first device orientation signal.

20. The method of claim 14 wherein the first wearable electronic device is an electronic ring.

21. A wearable electronic device comprising:
a processor;
a device orientation sensor communicatively coupled to the processor, the device orientation sensor to generate a first device orientation signal indicative of a first orientation of the wearable electronic device as oriented on a user; and a communication interface communicatively coupled to the processor, the communication interface to transmit the first device orientation signal to a different wearable electronic device, wherein the first device orientation signal is receivable by the different wearable electronic device to dynamically orient an orientable user interface presented on a display of the different wearable electronic device to an orientation that is based on the first orientation of the wearable electronic device indicated by the first device orientation signal.

22. The wearable electronic device of claim 21 wherein:
the device orientation sensor is further to generate a second device orientation signal indicative of a second orientation of the wearable electronic device, and
the communication interface is further to transmit the second device orientation signal, wherein the second device orientation signal is receivable by the different wearable electronic device to dynamically reorient the orientable user interface presented on the display of the different wearable electronic device to different orientation that is based on the second orientation of the wearable electronic device indicated by the second device orientation signal.

23. The wearable electronic device of claim 21 wherein the device orientation sensor is to generate a device orientation signal in response to an orientation change of the wearable electronic device, the device orientation signal indicating the orientation change of the wearable electronic device.

24. The wearable electronic device of claim 21 wherein the wearable electronic device comprises an electronic ring.

25. The wearable electronic device of claim 21 wherein the different wearable electronic device comprises a head mounted electronic display unit.

26. The wearable electronic device of claim 21 wherein the device orientation sensor is at least one of an inertial sensor, an accelerometer, or a gyroscope.

27. A wearable electronic device comprising:
a processor;
a communication interface coupled to the process, the communication interface to receive at least one device orientation signal from a different wearable electronic device; and
a display communicatively coupled to the processor, the display to generate and present an orientable user interface, the orientable user interface orientable in a first orientation determined based on a first orientation of the different wearable electronic device on a user, the first orientation on the user represented by a first device orientation signal received from the different wearable electronic device and the orientable user interface dynamically reorientable in a second orientation determined based on a second orientation of the different wearable electronic device on the user, the second orientation on the user represented by a second device orientation signal received from the different wearable electronic device.

28. The wearable electronic device of claim 27 wherein the orientable user interface is enabled to be dynamically reoriented within a selected portion of the display in response to the communication interface receiving the at least one device orientation signal.

29. The wearable electronic device of claim 27 wherein the communication interface is a wireless communication interface further communicatively coupleable with a communication interface of the different wearable electronic device.

30. The wearable electronic device of claim 27 wherein the display is further to dynamically reorient the orientable user interface between a first user interface orientation mode and a second user interface orientation mode in response to the communication interface receiving the at least one device orientation signal.

31. The wearable electronic device of claim 27 wherein the orientable user interface is enabled to be dynamically reoriented within a second portion of the display that is different than a first portion of the display currently presenting the orientable user interface in response to the communication interface receiving the at least one device orientation signal.

32. The wearable electronic device of claim 27 wherein the wearable electronic device comprises a head mounted electronic display unit.

33. A method at a first wearable electronic device, the method comprising:
receiving a first device orientation signal from a second wearable electronic device, the first device orientation signal representing a first orientation of the second wearable electronic device on a user;
orienting an orientable user interface within a display in a first orientation based on the first orientation of the second wearable electronic device;
receiving a second device orientation signal from the second wearable electronic device, the second device orientation signal representing a second orientation of the second wearable electronic device on the user; and
dynamically reorienting the orientable user interface on the display in a second orientation based on the second orientation of the second wearable electronic device.

34. The method of claim 33 wherein dynamically reorienting the orientable user interface comprises reorienting the orientable user interface within a selected portion of the display associated with the second orientation.

35. The method of claim 34 wherein the selected portion is different than a current portion of the display presenting the orientable user interface in the first orientation.

* * * * *